3,558,707
PROCESS FOR PREPARING FLUOROANILINES
John W. Churchill and Ehrenfried H. Kober, Hamden, and Peter H. Scott, Guilford, Conn., assignors to Olin Corporation, a corporation of Virginia
No Drawing. Filed Sept. 9, 1968, Ser. No. 758,602
Int. Cl. C07c 85/10
U.S. Cl. 260—580          5 Claims

ABSTRACT OF THE DISCLOSURE

Fluoroanilines are prepared by the deoxygenation and hydrofluorination of the corresponding nitrobenzenes which are reacted in anhydrous hydrogen fluoride at 0° to 230° C. under pressures of from 15 to 1500 p.s.i.a. in the presence of certain deoxygenating agents containing phosphorus or sulfur.

---

This invention relates to improvements in the direct conversion of nitrobenzenes to fluoroanilies. Catalytic hydrogenation is avoided and improved yields of fluoroanilines are obtained with less of the unfluorinated anilines.

Many of the fluoroanilines having at least one chloro, nitro or methyl substituent in the ring are known compounds and the corresponding substituted nitrobenzenes used as starting materials are also known compounds. While the method of this invention is particularly described with reference to the conversion of nitrobenzene to p-fluoroaniline, it is also useful for the preparation of the variously substituted fluoroanilines.

p-Fluoroaniline is a known compound of known utility disclosed, for example in U.S. Pat. 2,884,458. That patent also describes and claims a process for the manufacture of p-fluoroaniline by catalytic hydrogenation of nitrobenzene in anhydrous hydrogen fluoride. Further details on that process appear in J. Org. Chem. 26, 4014–7 (1961). In the catalytic hydrogenation process, considerable amounts of ordinary aniline accompany the p-fluoroaniline and are only difficultly separated therefrom. In general, from ¼ to ½ or more of the aniline product is ordinary aniline and the balance is p-fluoroaniline.

One object of this invention is to provide a simpler, cheaper and otherwise improved process for the direct conversion of nitrobenzenes to fluoroanilines. More particularly, an object of this invention is to provide an improved process resulting in a product containing less of the corresponding unfluorinated aniline as a contaminant of the product. A further object of the invention is to provide a process in which yields of fluoroanilines are improved.

The process of this invention generally comprises reacting, at a temperature of from 0° to 230° C. under a pressure of from 15 to 1500 p.s.i.a., a mixture of a nitrobenzene, anhydrous hydrogen fluoride and a deoxygenating agent selected from the group consisting of elemental phosphorus, elemental sulfur, phosphorus trihalides, sulfur halides in which sulfur has a valence lower than 6, aryl phosphorus halides, aryl sulphenyl halides and triaryl phosphines.

Suitable nitrobenzenes for use as starting materials are nitrobenzene itself and substituted nitrobenzenes having as substituent at least one of methyl, chloro and nitro substituents. Examples of nitrobenzenes suitable as starting materials and of the fluoroanilines produced by the process of this invention include, but are not limited to the following:

| Nitrobenzene starting materials: | Fluoroaniline products |
|---|---|
| Nitrobenzene | p-Fluoroaniline. |
| m-Chloronitrobenzene | 3-chloro-4-fluoroaniline. |
| m-Nitrotoluene | 4-fluoro-3-toluidine. |
| o-Nitrotoluene | 4-fluoro-2-toluidine. |
| 2,5-dichloronitrobenzene | 2,5-dichloro-4-fluoroaniline. |
| m-Dinitrobenzene | 3 - nitro-4-fluoroaniline. |
| o-Chloronitrobenzene | 2-chloro-4-fluoroaniline. |
| 4-methyl-1,3-dinitrobenzene | 5-nitro - 4 - fluoro-2-toluidine. |

Generally the fluorine substituent takes the para position to a nitro group when that position is open and the product is a p-fluoroaniline.

Suitable deoxygenating agents include red or yellow elemental phosphorus, elemental sulfur in any of its allotropic forms, phosphorus and sulfur halides including the fluorides, chlorides, bromides and iodides of trivalent phosphorus and of sulfur lower in valence than 6. Suitable examples include $PF_3$, $PCl_3$, $S_2Cl_2$, $SCl_2$, $SCl_4$ and $S_2Br_2$. Suitable aryl phosphorus and sulfur halides include, for example, diphenyl phosphorus chloride, di-p-tolyl phosphorus chloride and benzene sulphenyl chloride. Suitably triaryl phosphines include triphenyl phosphine, tri-o-tolyl phosphine, tri-p-tolyl phosphine and tri-p-bromophenylphosphine. Mixtures of these deoxygenating agents are also suitable.

In the process of this invention, the deoxygenating agents act as oxygen acceptors and form oxidation products, for example, $POCl_3$, $SOCl_2$ and triphenyl phosphine oxide. The by-products are easily separated from the product fluoroanilines. The anhydrous hydrogen fluoride supplies hydrogen for conversion of the nitro groups to $NH_2$ and supplies fluorine for substitution on the ring. It is important to maintain the hydrogen fluoride at least partly in the liquid phase and therefore the critical temperature of hydrogen fluoride at 230° C. should not be exceeded. The pressures are suitably autogenous but higher pressures are also suitable if desired.

The various deoxygenating agents vary in activity. For example, benzene sulphenyl chloride reacts even at atmospheric pressure and at 0° C. Higher temperatures are preferable, however, for most of the deoxygenating agents, for example, 120° C. to 170° C. or higher for the tertiary aryl phosphines.

The time required for the reaction also varies widely with different deoxygenating agents and satisfactory yields are obtained in from 1 to 10 hours or more.

The molar ratio of deoxygenating agent to the nitrobenzene is suitably at least 0.3:1. Less can be used, but the yields suffer. Preferably the molar ratio is at least 0.5:1 and ratios up to about 5:1 are suitably but more of the deoxygenating agent appears unnecessary.

The minimum stoichiometric molar ratio of hydrogen fluoride to the nitrobenzene is 1:1. Less can be used, but the yields suffer. Preferably a molar ratio of hydrogen fluoride to the nitrobenzene of at least 1:1 is used and molar ratios up to 50:1 are suitable but more hydrogen fluoride can be used, if desired. Preferably molar ratios of from 10:1 to 30:1 are used.

After reaction is completed, the product is isolated in any convenient manner. For example, excess hydrogen fluoride is evaporated or distilled off. Water is added and the oxidation product together with unconverted deoxygenating agent, both of which are usually insoluble in water, are filtered off or otherwise separated. The aqueous layer is made alkaline and the liberated anilines are separated and/or extracted with any suitable water immiscible organic solvent, for example, ether. The extract is dried and distilled to recover the fluoroaniline product.

It is an advantage of the process of this invention that no special purification of reagents is necessary since there are no catalysts to poison. A further advantage is that the amount of the aniline contaminant is usually considerably reduced. This is a significant improvement over the art and is particularly important since the anilines and the corresponding fluoroanilines frequently have closely similar boiling points and are only difficultly separable by distillation. For example, aniline and p-fluoroaniline boil at atmospheric pressure within about 3° C. of each other.

EXAMPLE I

A 300 ml. Hasteloy B rocking autoclave was charged with 8.2 g. (0.067 mole) of nitrobenzene, 26.2 g. (0.1 mole) of triphenylphosphine and 25 g. (1.25 mole) of anhydrous liquid HF. The mixture was heated to 150° C. at 125 p.s.i.g. autogenous pressure and maintained at that temperature for three hours. After cooling, the contents of the autoclave were discharged into a plastic beaker and most of the HF was evaporated using a nitrogen sparge. The residue was partitioned between water and ether, and the insolubles, mainly triphenylphosphine oxide, were filtered off. The ether and water layers were separated and the latter was made basic by slow addition of aqueous sodium hydroxide. The acid soluble material thus liberated was recovered by ether extraction. By vapor phase chromatography, the yield of total anilines was 43% of which 89% was p-fluoroaniline.

EXAMPLE II

A 300 ml. Hasteloy B rocking autoclave was charged with 3.38 g. (0.0275 mole) of nitrobenzene, 21.6 g. (0.0825 mole) of triphenylphosphine and 25 g. (1.25 mole) of anhydrous liquid HF. The mixture was heated to 150° C. at autogenous pressure and maintained at that temperature for three hours. After cooling, the contents of the autoclave were discharged into a plastic beaker and most of the HF was evaporated using a nitrogen sparge. The residue was partitioned between water and benzene. The water layer was separated and made basic by slow addition of aqueous sodium hydroxide. The acid soluble material thus liberated was recovered by ether extraction. By vapor phase chromatography, the yield of total anilines was 72% of which 79% was p-fluoroaniline.

EXAMPLE III

A 300 ml. Hasteloy B rocking autoclave was charged with 6.15 g. (0.05 mole) of nitrobenzene, 13.7 g (0.1 mole) of phosphorus trichloride, 4.5 g. (0.025 mole) of phosphorus pentachloride and 50 ml. (2.5 moles) of anhydrous liquid HF. The mixture was heated to 140° C. at autogenous pressure and maintained at that temperature for 7 hours. After cooling, the contents of the autoclave were discharged into a plastic beaker and most of the HF was evaporated using a nitrogen sparge. The residue was partitioned between water and ether, and insolubles were filtered off. The ether and water layers were separated and the latter was made basic by slow addition of aqueous sodium hydroxide. The acid soluble material thus liberated was recovered by ether extraction. By vapor phase chromatography, the yield of total anilines was 25% of which 84 mole percent was p-fluoroaniline.

EXAMPLE IV

A 300 ml. Hasteloy B rocking autoclave was charged with 12.3 g. (0.10 mole) of nitrobenzene, 6.2 g. (0.20 mole) of red phosphorus and 50 ml. (2.5 moles) of anhydrous liquid HF. The mixture was heated to 150° C. at 425 p.s.i.g. autogenous pressure and maintained at that temperature for 16 hours. After cooling, the contents of the autoclave were discharged into a plastic beaker and most of the HF was evaporated using a nitrogen sparge. The residue was partitioned between water and ether, and insolubles were filtered off. The ether and water layers were separated, and the latter was made basic by slow addition of aqueous sodium hydroxide. The acid soluble material thus liberated was recovered by ether extraction. By vapor phase chromatography, the yield of total anilines was 69% of which 56.7 mole percent was p-fluoroaniline.

EXAMPLE V

A 300 ml. Hasteloy B rocking autoclave was charged with 6.15 g. (0.05 mole) of nitrobenzene, 17.9 g. (0.10 mole) of phenyl phosphorus dichloride and 25 g. (1.25 mole) of anhydrous liquid HF. The mixture was heated to 150° C. at 475 p.s.i.g. autogenous pressure and maintained at that temperature for three hours. After cooling, the contents of the autoclave were discharged into a plastic beaker and most of the HF was evaporated using a nitrogen sparge. The residue was partitioned between water and ether, and insolubles were filtered off. The ether and water layers were separated, and the latter was made basic by slow addition of aqueous sodium hydroxide. The acid soluble material thus liberated was recovered by ether extraction. By vapor phase chromatography, the yield of total anilines was 18% of which 24 mole percent was p-fluoroaniline.

EXAMPLE VI

A 300 ml. Hasteloy B rocking autoclave was charged with 12.3 g. (0.10 mole) of nitrobenzene, 9.0 g. (0.067 mole) of sulfur monochloride and 50 g. (2.50 moles) of anhydrous liquid HF. The mixture was heated to 140° C. at 500 p.s.i.g. autogenous pressure and maintained at that temperature for three hours. After cooling, the contents of the autoclave were discharged into a plastic beaker and most of the HF was evaporated using a nitrogen sparge. The residue was partitioned between water and ether, and insolubles were filtered off. The ether and water layers were separated, and the latter was made basic by slow addition of aqueous sodium hydroxide. The acid soluble material thus liberated was recovered by ether extraction. By vapor phase chromatography, the yield of total anilines was 20% of which 86.8 mole percent was p-fluoroaniline.

EXAMPLE VII

The procedure of Example V was repeated at a temperature of 60° C. and a pressure of 100 p.s.i.g. p-Fluoroaniline was formed but in smaller yield.

EXAMPLE VIII

A 300 ml. Hasteloy B rocking autoclave was charged with 6.15 g. (0.05 mole) of nitrobenzene, 11.8 g. (0.134 mole) of phosphorus trifluoride and 25 g. (1.25 mole) of anhydrous HF. The mixture was heated to 150° C. at 750 p.s.i.g. autogenous pressure and maintained at that temperature for 5 hours. After cooling, the contents of the autoclave were discharged into a plastic beaker and most of the HF was evaporated using a nitrogen sparge. The residue was partitioned between water and ether, and insolubles were filtered off. The ether and water layers were separated, and the latter was made basic by slow addition of aqueous sodium hydroxide. The acid soluble material thus liberated was recovered by ether extraction. By vapor phase chromatography, the yield of total anilines was 63% of which 21 mole percent was p-fluoroaniline.

EXAMPLE IX

A solution of 1.23 g. (0.01 mole) of nitrobenzene in 25 ml. of liquid HF was cooled in an ice bath to 0° C., and then 2.89 g. (0.02 mole) of benzene sulphenyl chloride was added dropwise to this solution at a rate such that the temperature was maintained at 3° C. or below. The pressure was atmospheric. After the addition was completed, the solution was stirred at 0° C. for three hours. The HF solvent was then evaporated at ambient temperature, and the residue was extracted with water. The aqueous solution was made basic by the addition of 20% NaOH and the anilines were extracted with ether. Evaporation of the ether yielded the crude p-fluoroaniline.

EXAMPLE X

A mixture of 12.3 g. (0.10 mole) of nitrobenzene and 6.4 g. (0.2 mole) of sulfur in 25 ml. of liquid HF was heated for 11 hours at 185° C. in a Monel-lined 300 ml. rocking autoclave. The mixture was discharged from the autoclave and the HF was evaporated. The residual grayish yellow solids were pulverized and slurried with water. The aqueous portion was filtered and made basic. Ether extraction of the basic solution and evaporation of the ether yielded the crude p-fluoroaniline.

EXAMPLE XI

A 100 ml. Hasteloy autoclave was charged with 3.16 g. (0.02 mole) of m-chloronitrobenzene, 10.48 g. (0.04 mole) of triphenylphosphine, and 10 g. (0.50 mole) of anhydrous HF. The mixture was heated to 150° C. at 130 p.s.i.g. autogenous pressure and maintained at that temperature for three hours. After cooling, the contents of the autoclave were discharged into a plastic beaker and most of the HF was evaporated using a nitrogen sparge. Water was added to the residue and the insolubles, mainly triphenylphosphine oxide, were filtered off. The water layer was made basic by slow addition of 30% potassium hydroxide. The acid soluble material thus liberated was recovered by ether extraction. By vapor phase chromatography, the yield of total anilines was 79.1% of which 52.8 mole percent was the fluoroaniline.

EXAMPLE XII

A 100 ml. Hasteloy autoclave was charged with 2.72 g. (0.02 mole) of m-nitrotoluene, 10.48 g. (0.04 mole) of triphenylphosphine, and 10 g. (0.50 mole) of anhydrous HF. The mixture was heated to 150° C. at 150 p.s.i.g. autogenous pressure and maintained at that temperature for three hours. After cooling, the contents of the autoclave were discharged into a plastic beaker and most of the HF was evaporated using a nitrogen sparge. Water was added to the residue and the insolubles, mainly triphenylphosphine oxide, were filtered off. The water layer was made basic by slow addition of 30% potassium hydroxide. The acid soluble material thus liberated was recovered by ether extraction. By vapor phase chromatography, the yield of total anilines was 88.5% of which 86.7 mole percent was 4-fluoro-3-toluidine.

EXAMPLE XIII

A 100 ml. Hasteloy autoclave was charged with 2.72 g. (0.02 mole) of o-nitrotoluene, 10.48 g. (0.04 mole) of triphenylphosphine, and 10 g. (0.50 mole) of anhydrous HF. The mixture was heated to 150° C. at 50 p.s.i.g. autogenous pressure and maintained at that temperature for three hours. After cooling, the contents of the autoclave were discharged into a plastic beaker and most of the HF was evaporated using a nitrogen sparge. Water was added to the residue and the insolubles, mainly triphenylphosphine oxide, were filtered off. The water layer was made basic by slow addition of 30% potassium hydroxide. The acid soluble material thus liberated was recovered by ether extraction. By vapor phase chromatography, the yield of total anilines was 90.6% of which 90.8 mole percent was 4-fluoro-2-toluidine.

EXAMPLE XIV

A 100 ml. Hasteloy autoclave was charged with 3.84 g. (0.02 mole) of 2,5 - dichloronitrobenzene, 10.48 g. (0.04 mole) of triphenylphosphine, and 10 g. (0.50 mole) of anhydrous HF. The mixture was heated to 150° C. at 130 p.s.i.g. autogenous pressure and maintained at that temperature for three hours. After cooling, the contents of the autoclave were discharged into a plastic beaker and most of the HF was evaporated using a nitrogen sparge. Water was added to the residue and the insolubles, mainly triphenylphosphine oxide, were filtered off. The water layer was made basic by slow addition of 30% potassium hydroxide. The substituted fluoroaniline thus liberated was recovered by ether extraction.

EXAMPLE XV

A 100 ml. Hasteloy autoclave was charged with 3.36 g. (0.02 mole) of m-dinitrobenzene, 10.48 g. (0.04 mole) of triphenylphosphine and 10 g. (0.5 mole) of anhydrous HF. The mixture was heated to 150° C. at 130 p.s.i.g. autogenous pressure and maintained at that temperature for three hours. After cooling, the contents of the autoclave were discharged into a plastic beaker and most of the HF was evaporated using a nitrogen sparge. Water was added to the residue and the insolubles, mainly triphenylphosphine oxide, were filtered off. The water layer was made basic by slow addition of 30% potassium hydroxide. The substituted fluoroaniline thus liberated was recovered by ether extraction.

What is claimed is:

1. Process for preparing a fluoroaniline which comprises heating at a temperature of from 0° to 230° C. under a pressure of 15 to 1500 p.s.i.a. a mixture of anhydrous hydrogen fluoride, a nitrobenzene selected from the group consisting of nitrobenzene and substituted nitrobenzenes having as substituent at least one of methyl, chloro and nitro substituents and a deoxygenating agent selected from the group consisting of elemental phosphorus, elemental sulfur, phosphorus trihalides, sulfur halides in which sulfur has a valence lower than 6, aryl phosphorus halides, aryl sulphenyl halides, and triaryl phosphines.

2. Process as claimed in claim 1 in which the molar ratio of said deoxygenating agent to said nitrobenzene is at least 0.3:1.

3. Process as claimed in claim 1 in which the molar ratio of said hydrogen fluoride to said nitrobenzene is at least 1:1.

4. Process as claimed in claim 1 in which said deoxygenating agent is triphenylphosphine and the temperature is 120° to 170° C.

5. Process as claimed in claim 1 in which said nitrobenzene is nitrobenzene and said fluoroaniline is p-fluoroaniline.

References Cited

UNITED STATES PATENTS 2,884,458   4/1959   Fidler _____ 260—580

CHARLES B. PARKER, Primary Examiner

R. L. RAYMOND, Assistant Examiner

U.S. Cl. X.R.

260—583